3,193,524
POLYESTER PLASTICS STABILIZED WITH
CARBODIIMIDES
Hans Holtschmidt, Cologne-Stammheim, Günther Loew, Cologne, Günther Nischk, Leverkusen, and Fritz Moosmüller, Dormagen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Continuation of application Ser. No. 618,458, Oct. 26, 1956. This application Oct. 29, 1962, Ser. No. 233,869
Claims priority, application Germany, Oct. 26, 1955, F 18,732
3 Claims. (Cl. 260—45.9)

This invention relates to new polyester plastics and a process for preparing the same. More particularly, the invention is concerned with polyester plastics containing a small amount of a carbodiimide which are stable to hydrolysis.

It is well known to produce polyester plastics, such as flexible and rigid foams, rubber-like materials, lacquers, coatings and films, from saturated or unsaturated hydroxyl polyesters. These polyester plastics have in general good mechanical properties. As compared to plastics based on rubber, the polyester plastics have the advantage of not being adversely affected by oxygen. However, for certain applications, polyester plastics are less suitable than rubber-based plastics since they are not entirely stable to hydrolytic degradation, which results in a gradual deterioration of their mechanical properties. This is particularly true of polyester plastics having a large surface, such as flexible foams used in the production of mattresses and other upholstered articles, which have to stand up for extended periods of time or in tropical climates characterized by high temperatures and humidities.

It is an object of the present invention to provide polyester plastics which are stable to hydrolytic degradation. Another object of the invention is to provide polyester plastics which can be made into articles to be used over extended periods and under the conditions of a tropical climate. A further object is to provide polyester foams suitable for use as cushioning material in sofas, mattresses and other upholstered articles to be used over long periods or in a tropical climate. A still further object is to provide processes for preparing these new polyester plastics. Still further objects will appear hereinafter.

It has now been found in accordance with this invention that polyester plastics containing a small amount of a carbodiimide are absolutely stable to hydrolytic degradation. Accordingly, the present invention provides polyester plastics containing a small amount of a carbodiimide and processes for preparing such polyester plastics, which processes comprise incorporating a small amount of a carbodiimide into a polyester plastic.

The invention is applicable to all kinds of polyester plastics, such as polyester plastics prepared by copolymerization of an unsaturated polyester with a vinyl compound or by reaction of an hydroxyl polyester with a polyisocyanate to form a crosslinked polyurethane.

As examples of carbodiimides which are useful in the practice of the invention, there may be mentioned diisopropylcarbodiimide, dicyclohexylcarbodiimide, methyltert.-butylcarbodiimide and tert.-butylphenylcarbodiimide. There may also be employed bis-carbodiimides of the type obtainable according to German Patent 924,751, such as tetramethylene-bis-diisobutylcarbodiimide.

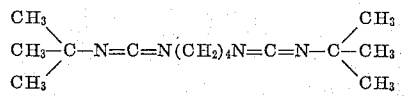

Furthermore, the invention contemplates the use of carbodiimides which contain additional functional groups, such as a tertiary amino group, which accelerates polyester-polyisocyanate reactions, or hydroxyl groups, which take part in polyaddition reactions with polyisocyanates. As examples of such carbodiimides, there may be mentioned N-dimethylaminopropyl-tert.-butylcarbodiimide

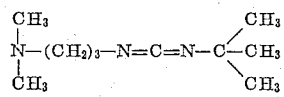

and the monoglycol ether of hydroxy phenyl-tert.-butylcarbodiimide

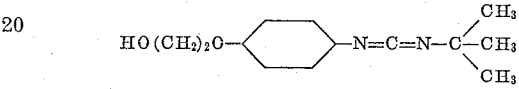

In order to prepare the polyester plastics of the invention, a small amount of a carbodiimide is added to at least one of the components serving as starting materials. Alternatively, a small amount of a carbodiimide can be incorporated into the polyester plastic after its formation. Although the amount of carbodiimide to be added to the starting materials or to be incorporated into the polyester plastic after its formation can vary within wide limits, it is preferred to use the carbodiimide in an amount of 0.1 to 5% by weight, based on the weight of the end product.

In carrying out the process of the invention, the carbodiimide can be added to any component of the polyester plastic whose reactivity is not adversely affected by the presence of the carbodiimide. Thus, in the production of copolymers from unsaturated polyesters and vinyl compounds in the presence of polymerization catalysts, the carbodiimide can be added either to the unsaturated polyester component or to the vinyl compound, but in most cases it will not be advisable to add the carbodiimide to the catalyst. In the production of polyurethane plastics, the carbodiimide can most advantageously be mixed with the polyhydroxy compound prior to carrying out the polyaddition reaction of the latter and the polyisocyanate. If it is desired to incorporate the carbodiimide into the polyester plastic after its formation, various procedures can be followed. With volatile carbodiimides, it is possible to produce a carbodiimide-gas atmosphere into which the polyester plastic can be placed in order to take up the necessary amount of carbodiimide. As an example of a volatile carbodiimide suitable for use in this embodiment of the process of the invention, there may be mentioned diisopropylcarbodiimide. Another method of incorporating the carbodiimide into the polyester plastic involves applying a liquid carbodiimide or a solution of a liquid or solid carbodiimide to the surface of the polyester plastic, such as by coating, spraying or dipping.

The incorporation of the carbodiimide into the polyester plastic after its formation gives particularly satisfactory results in cases where the polyurethane plastic has a large surface, such as a foam, film or coating.

The following working examples are given to show the beneficial effect of carbodiimides on the property of polyester plastics, but it is to be understood that the invention is not restricted to the specific compounds listed in the examples nor to the conditions of reaction set forth therein. Parts given are parts by weight.

Example 1

The following table shows the mechanical properties of:

(1) A polyurethane foam (Foam I) prepared by mixing 100 parts of a polyester obtained by thermal esterification of 16 mols of adipic acid, 16 mols of diethylene glycol and 1 mol of trimethylolpropane, having the hydroxyl number 65, with 3 parts of the adipic acid ester of N-diethylethanolamine, 1.5 parts of diethylammoniumoleate, 1.5 parts of a mixture of sulfonated castor oil and ricinoleic acid sulfate (1:1), 1.5 parts of water and 33 parts of toluylene diisocyanate-2,4 and -2,6 (isomer ratio 70:30);

(2) A polyurethane foam (Foam II) prepared from the same components as Foam I but with addition of 1.5% by weight of diisopropylcarbodiimide to the polyester starting material (3) A polyurethane foam (Foam III) prepared from the same components as Foam I but with addition of 3% by weight of tetramethylene-bis-diisobutylcarbodiimide to the polyester starting material In each case, there are indicated the properties of a fresh sample and of a sample after artificial aging by keeping at 70° C. at 95% humidity for 12 days. As may be seen from the table, the mechanical properties of Foam I considerably deteriorate in the aging process. As contrasted to Foam I, Foams II and III (see in particular the Stauch hardness) are not materially affected by the aging process.

| | Elasticity, percent | Tear resistance, kg./cm. | Tensile strength, kg./cm.$^2$ | Stauch hardness (ASTM D 1055-52) 40% compression, g./cm.$^2$ |
|---|---|---|---|---|
| Foam I: | | | | |
| Fresh | 22 | 0.61 | 0.86 | 48 |
| Aged | 18 | 0.57 | 0.61 | 25 |
| Foam II: | | | | |
| Fresh | 28 | 0.70 | 0.95 | 60 |
| Aged | 30 | 1.01 | 1.07 | 63 |
| Foam III: | | | | |
| Fresh | 22 | 0.77 | 0.98 | 56 |
| Aged | 21 | 0.85 | 1.08 | 49 |

The following tables show the changes in the mechanical properties in percent, based on the original values.

| | Elasticity, percent | Tear resistance, kg./cm. | Tensile strength, kg./cm.$^2$ | Stauch hardness (ASTM D 1055-52) 40% compression, g./cm.$^2$ |
|---|---|---|---|---|
| | Percent | Percent | Percent | Percent |
| Foam I | −18 | −7 | −29 | −48 |
| Foam II | +7 | +44 | +13 | +5 |
| Foam III | −5 | +10 | +10 | −12 |

Example 2

A polyurethane foam prepared in the same manner as Foam I of Example 1 was exposed to a gas atmosphere of diisopropyldiimide. The following table lists the mechanical properties of the fresh untreated foam and those of the treated foam after aging as described in Example 1.

| | Elasticity, percent | Tear resistance, kg./cm. | Tensile strength, kg./cm.$^2$ | Stauch hardness (ASTM D 1055-52) 40% compression, g./cm.$^2$ |
|---|---|---|---|---|
| Untreated foam, fresh | 21 | 0.43 | 0.67 | 59 |
| Treated foam, aged | 22 | 0.56 | 0.88 | 59 |
| Change in percent | +5 | +30 | +31 | 0 |

Example 3

A mixture of 196 g. of maleic acid anhydride, 148. g. of phthalic acid anhydride, 270 g. of 1.3-butylene-glycol, and 134 g. of trimethylol propane are heated to 195°–200° C. while passing nitrogen through the reaction mixture. Beginning at 170° C. water is split off while esterification proceeds. When temperature drops to 90° C., esterification is continued in vacuo at a temperature of 200° C. until an acid number of about 4 has been reached. The reaction product is cooled down to 230° C. and 0.250 g. of hydroquinone and 300 g. of styrene are added. Furthermore, 30 g. (3%) of dicyclohexylcarbodiimide are stirred into the mixture.

Polymerization is initiated by addition of 1% of benzoyl peroxide.

The following table shows the mechanical properties of the polymerization product obtained according to the foregoing procedure:

Bending strength _____ kg./cm.$^2$__ 1200
Tear resistance _____ kg./cm.__ 500

If a sample is artificially aged by keeping in water at 60° C. for 30 days the mechanical properties are as follows:

Bending strength _____ kg./cm.$^2$__ 1120
Tear resistance _____ kg./cm.__ 500

If polymerization is effected without adding dicyclohexylcarbodiimide the bending strength of the polymerization product drops to 650 kg./cm.$^2$ after aging as described above.

While certain representative embodiments and details have been shown for the purpose of illustrating this invention, it will be apparent to those skilled in the art that various changes and modifications may be made therein without departing from the spirit and scope of the invention.

This application is a continuation of our application Serial Number 618,458, filed October 26, 1956, now abandoned.

What is claimed is:

1. A polyester stabilized against hydrolytic degradation by a stabilizing amount of a carbodiimide having substituents selected from the group consisting of alkyl, aromatic and cycloalkyl in admixture therewith, said polyester being prepared by reacting a polyhydric alcohol with a polycarboxylic acid.

2. The polyester of claim 1 wherein from about 0.1 to about 5 percent by weight carbodiimide, based on the weight of the polyester, is admixed therewith.

3. A polyester polyurethane, the polyester portion having been prepared by reacting a polyhydric alcohol with a polycarboxylic acid stabilized against hydrolytic degradation by a stabilizing amount of a carbodiimide having substituents selected from the group consisting of alkyl, aromatic and cycloalkyl in admixture therewith.

References Cited by the Examiner

UNITED STATES PATENTS

| | | | |
|---|---|---|---|
| 2,415,043 | 1/47 | Rust | 260—551 |
| 2,430,479 | 11/47 | Pratt et al. | 260—75 |
| 2,654,680 | 10/53 | Goppel | 260—45.9 |
| 2,853,473 | 9/58 | Campbell et al. | 260—551 |
| 2,877,193 | 3/59 | Roussel | 260—45.9 |
| 2,917,486 | 12/59 | Nelson et al. | 260—45.9 |

LEON J. BERCOVITZ, *Primary Examiner.*